July 6, 1926.

H. KNECHT

BAND SAW GUIDE

Filed Dec. 22, 1925

1,591,456

Inventor:
Henry Knecht.
per: *Gavers*
Attorney.

Patented July 6, 1926.

1,591,456

UNITED STATES PATENT OFFICE.

HENRY KNECHT, OF MULHOUSE, FRANCE.

BAND-SAW GUIDE.

Application filed December 22, 1925, Serial No. 77,125, and in France December 30, 1924.

The present invention relates to an improved band-saw guide.

In some band-saw guides of known type, the band-saw passes between two guiding jaws and bears with its back against an adjustable roller.

In others the band-saw is guided between two rollers of adjustable length, and the back of the said band-saw bears against flanges with which such rollers are provided.

Both of these constructions have serious drawbacks, chiefly consisting in that:

1. Owing to the cumbersome construction the cutting height is very restricted.
2. The adjustment is difficult and complicated, especially in the case of band-saw guides having guiding jaws.
3. The very narrow space between the jaws only difficultly allows the passage of the welding of the band, hence friction and heating.
4. The cost price is rather high owing to the complicated construction.

The object of the present invention is to remedy such drawbacks by providing a band-saw guide of simple construction and easy of adjustment, wherein the loss of cutting height is reduced to a minimum, while its weight is only about half that of known devices.

Figure 1:
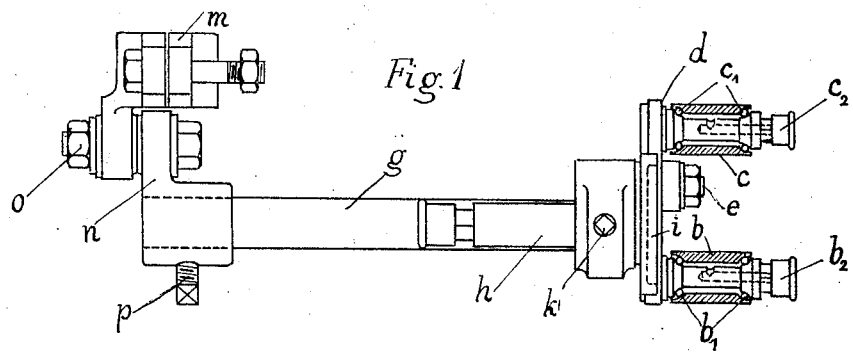
Figure 2:
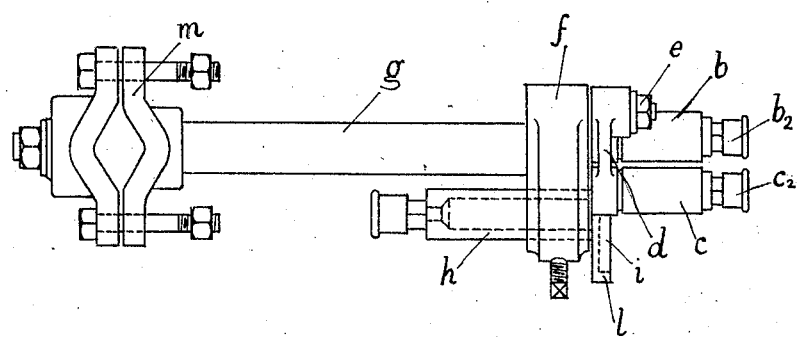
Figure 3:
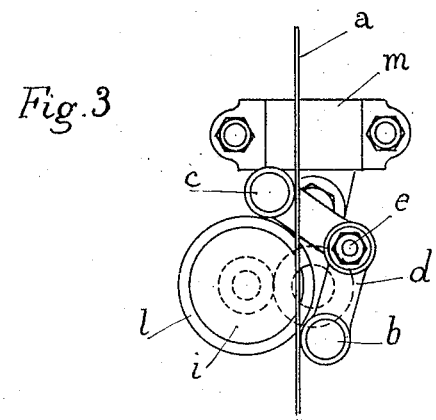

An embodiment of the band-saw guide according to the present invention is, by way of example, illustrated by the accompanying drawing, wherein:

Figure 1 is a side elevation and Figure 2 a view in plan of a band-saw guide according to the invention, and Figure 3 is an end view thereof.

Referring to the said drawing the band-saw $a$ (Fig. 3) is guided on each of its faces by a roller $b$ and $c$ respectively, the said rollers being mounted on ball-bearings $b^1$ and $c^1$ of which the lubrication is effected by means of a "Stauffer" lubricator $b^2$ and $c^2$ respectively. The said rollers are carried by an elbow-shaped support $d$ in such a manner that they engage the band-saw $a$ on each of its sides or faces. The said support $d$ is secured to a collar $f$ by means of a bolt $e$. The collar $f$ is mounted on a horizontal bar $g$ and has located therein a housing $h$ which forms a bearing for a disc-like flanged roller $i$ against which bears the back edge of the band-saw $a$. The adjustment of this roller $i$ according to the width of the band $a$ is effected by means of the adjustment screw $k$ which enables the housing $h$ to be moved forward according to needs. In order to avoid any drawback due to the band $a$ pressing against the edge of the flange $l$ of the roller $i$, the band $a$ should be placed in relation to this last named roller in such a manner that the radial distance between the outer circumference of the roller $i$ and the chord formed by the band $a$ is greater than the width of the flange $l$. The adjustment of the rollers $b$ and $c$ in relation to the band $a$ is effected by causing their support $d$ to pivot about the axis of the bolt $e$ and then securing the said support in position by means of the said bolt.

The described guiding device is fixed to the column of the band-saw by means of a clamp $m$ which carries a collar $n$ secured to the said clamp by means of a bolt $o$. In the collar $n$ is secured one end of the bar $g$, which is held in position in such collar $n$ by means of the adjustment screw $p$. The adjustment of the device is effected by causing the collar $n$ carrying the bar $g$ to pivot about the axis of the bolt $o$, and by causing the bar $g$ to slide axially within the collar $n$.

I claim:

In a band-saw guide, the combination of a clamp adapted to be fastened to the column of the band-saw; a collar carried by the said clamp and capable of pivotal adjustment about an axis at right angles to the central axis of said clamp; a horizontal bar having one end adjustably maintained in the said collar; a second collar carried by the other end of the said bar; an elbow-shaped roller-support carried by the said second collar and capable of pivotal adjustment about an axis parallel to that of the last-named collar; two guiding-rollers rotatably carried by the two ends respectively of the said roller-support and adapted to engage each one of the faces of the band-saw; and an axially adjustable disc-like flanged roller rotatably carried by the last-named collar and adapted to guide the back-edge of the band-saw; substantially as described.

In testimony whereof I signed hereunto my name.

HENRY KNECHT.